Patented Aug. 12, 1930

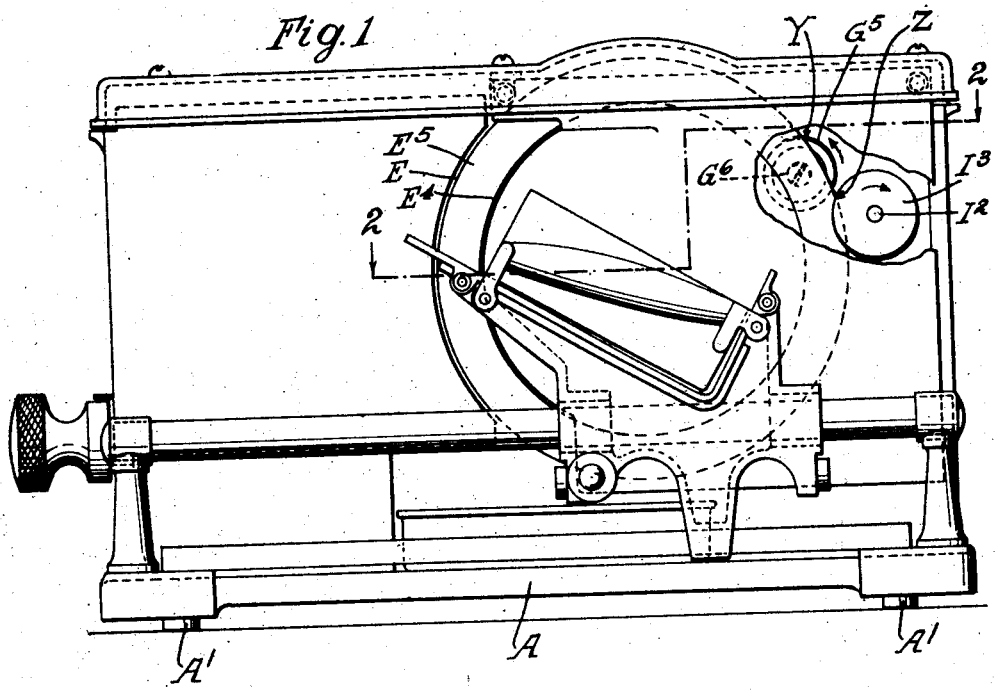

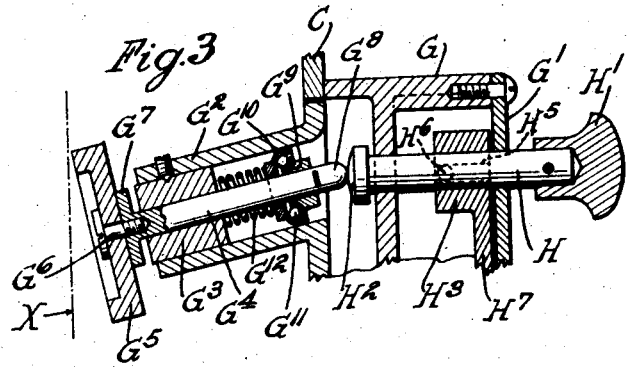
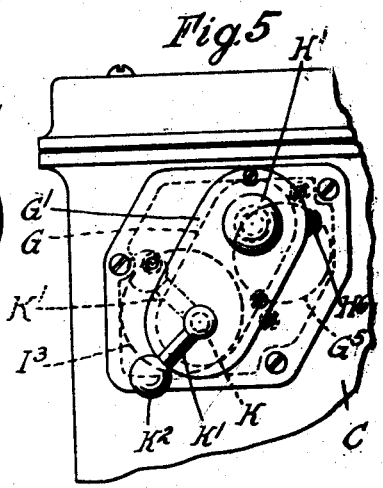
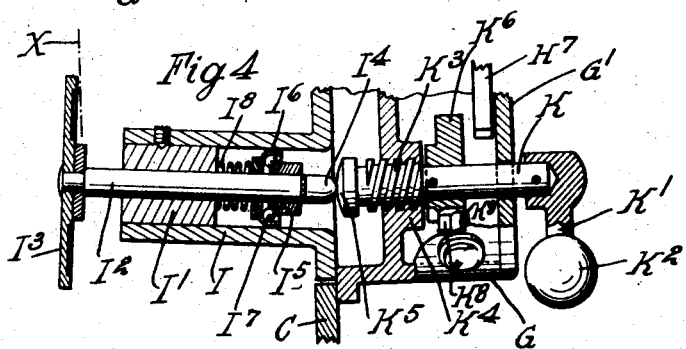
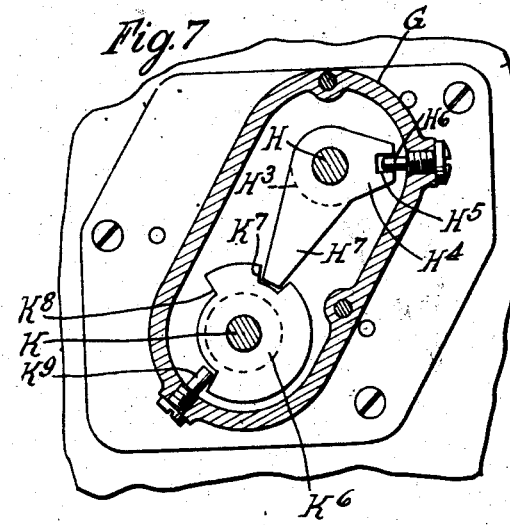
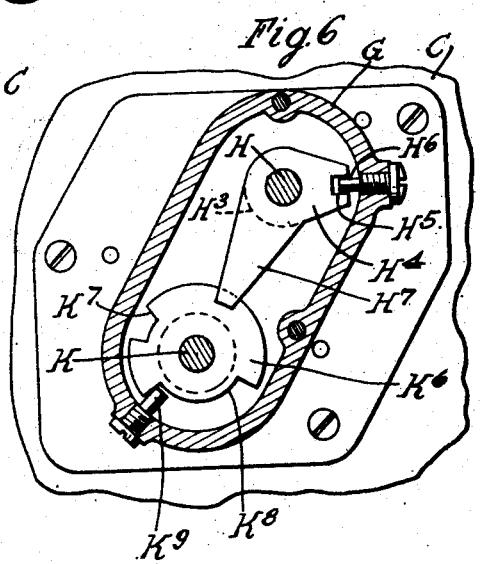

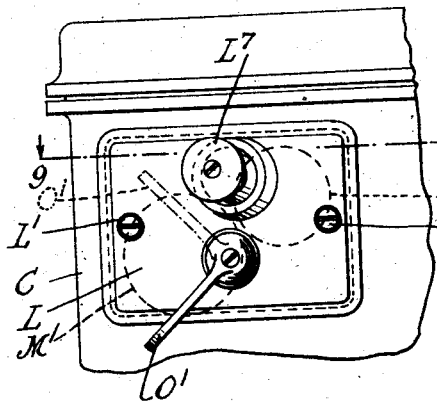
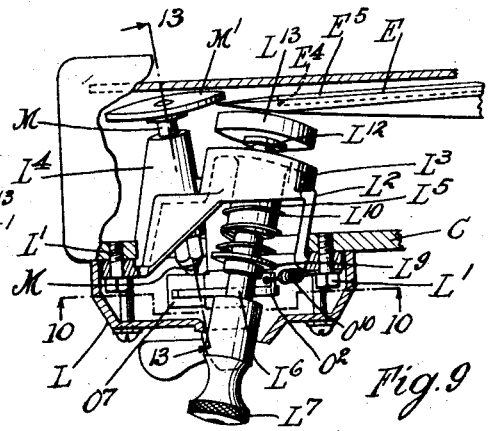
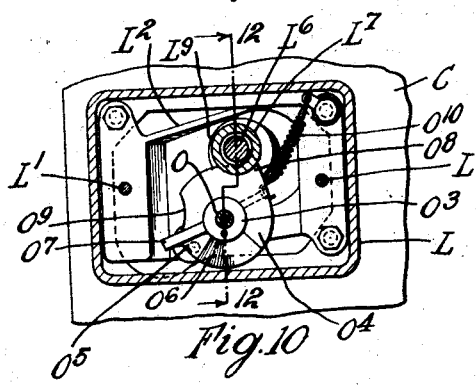
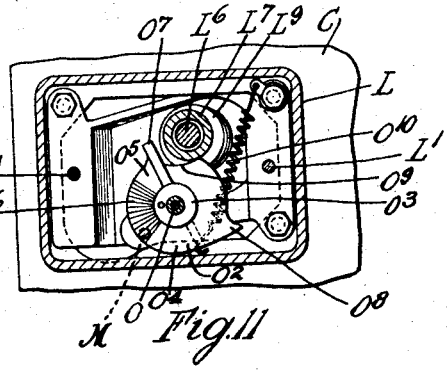
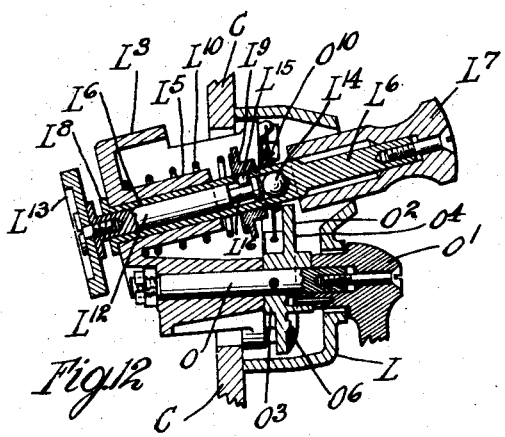
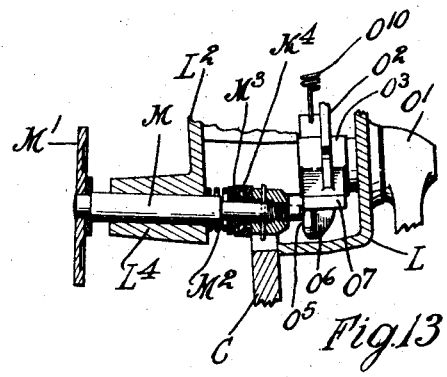
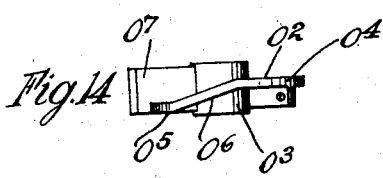

1,772,705

UNITED STATES PATENT OFFICE

WILLIAM J. CAMPBELL, OF INDIANAPOLIS, INDIANA, ASSIGNOR TO AMERICAN SLICING MACHINE COMPANY, OF CHICAGO, ILLINOIS, A CORPORATION OF NEW YORK

KNIFE SHARPENER FOR SLICING MACHINES

Application filed July 8, 1927. Serial No. 204,209.

My invention relates to a slicing machine, having a rotary knife, and relates particularly to means for sharpening said knife in response to the rotation thereof. A particular purpose is the provision of grinding or sharpening means which shall be effective to sharpen the knife, while preventing the formation of a burr upon the knife edge. Another object is the provision of sharpening means including opposed grinding and burr removing members on opposite sides of the knife. Another purpose is the provision of such opposed sharpening and burr removing means, and means for effecting the engagement of said burr remover prior to the engagement of said grinding member, and for holding said burr remover in engagement with the knife until after the grinding member is removed from operative engagement therewith.

I illustrate my invention more or less diagrammatically in the accompanying drawings, wherein—

Figure 1 is an elevation;

Figure 2 is a section on the line 2—2 of Figure 1;

Figure 3 is a section on the line 3—3 of Figure 2;

Figure 4 is a section on the line 4—4 of Figure 2;

Figure 5 is a detail elevation;

Figure 6 is a vertical section on an enlarged scale through the structure shown in Figure 5;

Figure 7 is a similar section with the parts in a different position;

Figure 8 is a view of a variant form of my device;

Figure 9 is a section on the line 9—9 of Figure 8;

Figure 10 is a section on the line 10—10 of Figure 9;

Figure 11 is a similar view with the parts in a different position;

Figure 12 is a section on the line 12—12 of Figure 10;

Figure 13 is a section on the line 13—13 of Figure 9; and

Figure 14 is a detail.

Like parts are indicated by like symbols throughout the specification and drawings.

A generally indicates any suitable base frame or member, provided for example with the supporting studs $A^1$.

Any suitable motor means may be provided, not herein shown, for actuating the driving belt B, herein shown as of triangular cross-section, to engage the inclined faced channel $B^1$ on the pulley $B^2$.

C is a knife supporting sleeve mounted on the base A and including the shield portion $C^1$. Mounted within the sleeve portion C is the inner sleeve D on which are mounted the ball bearing tracks $D^1$ to support the balls $D^2$ opposed to the inner tracks $D^3$ on the knife shaft $D^4$. $D^5$ are locking nuts whereby to secure the knife shaft and roller bearing together, the shaft $D^4$ being enlarged as at $D^6$ to engage the inner forward ball track $D^3$.

E is the knife disc proper, secured to the shaft assembly for example by the screw $E^1$, and additionally secured to the pulley $B^1$, for example by the screws $E^2$. The knife disc is shown as convex and is peripherally cut away or recessed on its hollow face as at $E^4$, to leave a peripheral portion $E^5$ projecting somewhat forwardly from the face of the knife.

G generally indicates a sharpener housing having a cover plate $G^1$. Associated with it is the sleeve $G^2$ in which is mounted the bearing $G^3$ in which rotates the shaft $G^4$ to the end of which is secured the grinding element $G^5$ by means of the screw $G^6$. The shaft $G^4$ is enlarged at the grinder end as at $G^7$ and is rounded at the opposite end as at $G^8$. $G^9$ is an inner ball race member and $G^{10}$ an outer ball race member, having between them the ball bearings $G^{11}$. $G^{12}$ is a coil spring compressed between the bearing member $G^3$ and the outer ball race $G^{10}$, thereby normally tending to move the grinding member $G^5$ into withdrawn position, as shown in Figure 3.

Mounted for axial movement in the housing member G is the push rod H which is provided with the manual knob $H^1$. At its inner end is the convex member $H^2$ opposed to the rounded end $G^8$ of the shaft $G^4$. Mounted on the stem of the rod H is a collar $H^3$ which is provided with a lateral projection or lug H⁴ channeled as at H⁵ to engage the stop H⁶ which serve to prevent rotation of the collar and of the shaft H, limiting it to axial movement. H⁷ is a second lateral projection or lug extending in a different direction from the rod H, as shown in Figure 7.

Associated with the housing G is a second sleeve I, having the bearing lug I¹ in which is rotatable the shaft I² which carries the burr removing member I³ which may for example be a steel disc. The opposite end of the shaft is rounded as at I⁴. I⁵ is an inner ball race and I⁶ an outer ball race, between which are the bearing balls I⁷. I⁸ is a coil spring compressed between the bearing member I¹ and the outer ball race I⁶ and which is adapted normally to draw the burr removing member I³ toward the knife, as shown in Figure 4, the line of the knife being diagrammatically indicated in Figures 3 and 4 as X.

Mounted for rotation in the housing G is the rod K which is provided with the external control handle K¹ with the ball weight K², whereby it may be rotated. It is provided with a worm portion K³ mounted in the conforming bearing member K⁴, whereby rotation in one direction advances the rod K toward the shaft I² and rotation in the opposite direction retracts it. K⁵ is a convex end portion in contact with the rounded end I⁴ of the shaft I².

Mounted on the rod K is the disc or collar K⁶ which is provided with a notch or cut away portion K⁷ conforming generally to the end of the member H⁷, as shown in Figure 7. It is also segmentally cut away as at K⁸ in line with the movement limiting stop K⁹, the portion of which will be clear from Figures 6 and 7.

Referring to Figures 8 to 14 inclusive L generally indicates a housing secured to the frame as by the screws L¹. L² generally indicates the interior supporting member including the boss L³ and L⁴. L⁵ is a bearing member integral with the boss L³. Slidable in it is the tube L⁶ to the upper end of which is secured the external knob L⁷. Its movement in one direction is limited by the terminal flange L⁸. Its movement in the opposite direction is limited by the flange L⁹, between which and the boss L³ is compressed the coil spring L¹⁰ which normally tends to withdraw the member L⁶ from the knife. Rotatable within the member L⁶ is the pin L¹² to which is secured the grinding member L¹³. L¹⁴ is a bearing ball interposed between the end of the pin L¹² and the end of the interior of the member L⁶. L¹⁵ is a movement limiting ball opposed to the reduced portion L¹⁶ of the pin L, which is adapted to prevent outward movement of the pin L¹² in relation to the member L⁶.

Mounted for rotation in the boss L⁴ is the pin M upon which is mounted the burr removing member M¹. It is normally thrust in the direction of the knife as by the spring M² engaging the collar M³ between which and the end of the pin M is any suitable anti-friction device M⁴ herein shown as a ball bearing assembly.

O indicates a pin mounted for rotation in the supporting assembly L². At its outer end is the manual lever O¹. Mounted upon it intermediate its ends is the cam member generally indicated as O² and illustrated in Figure 14. The cam O² includes the hub portion O³, the portions O⁴ and O⁵ lying in planes at right angles to the axis of the pin O and the intermediate inclined cam portion O⁶. O⁷ is a stop member lying in a plane in which lies the axis of the pin O and O⁸ is an outward stop extension of the surface O⁴. The member O⁴ is cut away as at O⁹ and it will be noted that when the knob L⁷ is aligned with the cut away portion O⁹ it is possible for the operator to thrust the grinding member L¹³ into contact with the knife. At all other positions of the cam the knob L⁷ engages the edge of the member O⁴ and is held against movement toward the knife. O¹⁰ indicates a tension spring adapted normally to rotate the cam O² into the position shown in Figure 10, with the stop cam O⁸ in engagement with the member L⁶.

It will be realized that whereas I have described and shown a practical and operative device nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

The grinding member G⁵ is normally held in withdrawn position by action of the spring G¹². In order thrust it against the knife it is necessary for the operator to exert pressure against the knob H¹ and thus to move the pin H longitudinally in its bearings. However, in sharpening the knife the engagement of the grinding disc with the knife edge normally results in the formation of a burr. In order to prevent such burr formation I provide the burr remover I³ which may be a steel disc, and which is drawn against the opposite side of the knife by action of the spring I⁸. In order to hold the burr remover normally out of contact with the knife I provide the member K with the worm K³ the convex member K⁵ of which normally contacts the end I⁴ of the shaft I², resisting the spring I⁸, and holding the burr remover in inoperative position. In the form of my device herein shown the weight K² tends to rotate the pin K into position, to hold the burr withdrawn from the knife. Referring to Figure 5, when the weight K² is in the position shown in full line the member K is advanced and the burr remover is out of contact with the knife. The weight $K^2$ is sufficient to resist the expansion of the spring $I^8$. When it is desired to permit the burr remover to engage the knife the lever $K^1$ and weight $K^2$ are rotated into the position shown in dotted line in Figure 5 and the spring $I^8$ can then draw the disc $I^3$ into contact with the knife.

I find it desirable to have the burr remover contact the knife prior to the contact of the grinding member, and also to have the burr remover maintain contact with the knife until after the grinding member is withdrawn therefrom. I therefore associate with the burr remover means for preventing engagement of the grinding member with the knife until the burr remover has been released for knife engagement. In the form herein shown I employ the collar or disc $K^6$. When in the position shown in Figure 7, that is to say with the lever raised to the dotted line position of Figure 5, the burr remover is released for knife engagement and the notch $K^7$ is in line with the lug $H^7$, so that the operator can exert manual pressure in the form of the device herein shown, in order to thrust the grinding disc $G^5$ positively against the beveled side of the knife. The operator, having raised the lever $K^1$ and having exerted pressure against the knob $H^1$, can then loose the lever $K^1$, as the engagement of the lug $H^7$ with notch $K^7$ will prevent retrograde movement of the lever. The operator continues exerting pressure against the knob $H^1$, applying sufficient pressure to obtain the desired result. When pressure is relaxed the spring $G^{12}$ expands, withdraws the disc $G^5$ from contact with the knife, and at the same time thrusts the pin H to the right as shown in Figure 3. As soon as the pin has moved a sufficient distance to disengage the lug the weight of the lever $K^1$ and the weight $K^2$ rotates the pin K into operative position, the spring $I^8$ is compressed, and the burr remover, after the disengagement of the grinding disc, is itself moved out of contact with the knife. The arcuate cut away portion $K^8$ serves to hold the rotation of the pin K to have the desired limits.

It will be clear from the above description and the drawings that in the normal operation of my device it will be impossible for an operator to thrust the grinding disc against the knife until after the burr remover has engaged the knife. Also, it will be impossible to cause the burr remover to recede from the knife until after the grinding disc has been withdrawn from the knife, once the grinding disc has been thrust thereagainst.

Furthermore, the thrust of the burr remover against the knife is fixed, and is entirely out of the control of the operator. In practice this is a considerable advantage, since the burr remover, or the thrust of the spring which controls it, may be set or controlled at the factory at the proper strength to remove the burr, and the careless user has no opportunity to exert an unnecessarily strong thrust against the knife.

The angularity of the grinding and burr removing elements towards the rotary knife E is illustrated in Figures 2, 3 and 4; the purpose of which is to have each sharpening element contact the knife only at one point. As indicated in Figure 1, the grinding member $G^5$ when in operation touches the knife at the point Y, the burr removing disc $I^3$ contacts the knife at the point Z, thereby rotating the sharpening elements in the directions as shown by arrows. In practice I have found the angles most suitable to give the desired results, for the grinding member to be 12° in the horizontal plane and 12° in the vertical plane, for the burr removing disc $I^3$ to be 7° in the horizontal plane and 3° 30′ in the vertical plane.

Referring to the structure of Figures 8 to 13, the spring $L^{10}$ normally holds the grinding member $L^{13}$ withdrawn from the knife. The spring $O^{10}$ normally holds the cam member $O^2$ in such position that the stop $O^8$ is in engagement with the member $L^6$. The edge of the portion $O^4$ of the cam serves as a positive stop to prevent any movement of the knob $L^7$ or the member $L^6$ and thus of the grinding member $L^{13}$ in the direction of the knife. The spring $M^2$ tends normally to move the burr removing member $M^1$ toward the knife but the portion $O^5$ of the cam member $O^2$ is interposed to hold the member $M^1$ withdrawn, and of course the spring $O^{10}$ is strong enough to overcome the thrust of the spring $M^2$. Thus both elements are positively locked against forward movement toward the knife.

When the operator rotates the lever $O^1$ to the position shown in dotted line in Figure 8 the cam is thereby rotated to release the burr removing member $M^1$ for engagement with the knife. When the lever is in the dotted line position the inner end of the pin M is opposed to the member $O^4$ of the cam member $O^2$, which is so proportioned as to permit engagement of the burr remover with the knife.

At the same time the cut away portion $O^9$ is brought into alignment with the knob $L^7$ and it is then possible for the operator to overcome the force of the spring $L^{10}$ by thrusting positively against the knob. Thus a movement of the lever $O^1$ to dotted line position causes the burr remover $M^1$ to move into contact with the knife, under thrust of the spring $M^2$. Thereafter the operator can manually overcome the thrust of the spring $L^{10}$. This disposition insures that the burr remover will engage the knife before the grinding member and will not leave the knife until after the grinding member is withdrawn, for once the knob L⁷ has been thrust inwardly into the plane of the cam member O⁴, the cam cannot rotate into the full line position, since the opposition of the knob L⁷ to the cut away portion O⁹ serves as a stop to resist the action of the spring O¹⁰.

I claim:

1. In association with a slicing machine having a rotary knife and means for driving it, a burr removing element opposed to one side of the knife edge, a control member therefor, yielding means tending normally to thrust said burr removing element toward the knife, locking means adapted normally to hold said burr removing element, against said yielding means, out of contact with the knife, a grinding element opposed to the opposite side of the knife, a control member therefor, yielding means normally holding said grinding element out of contact with the knife, an external control means for thrusting said grinding element, against such yielding means, toward the knife, and means for preventing the application of the grinder to the knife when the burr remover is out of contact with the knife, comprising a projection on said grinder control pin, an opposed locking member on the burr remover control member, said locking member being adapted to permit the passage of said projection when the burr remover is in operative position.

2. In association with a slicing machine having a rotary knife and means for driving it, a burr removing element opposed to one side of the knife edge, a rotatable control member therefor, yielding means tending normally to thrust said burr removing element toward the knife, locking means adapted to hold said burr removing element normally in inoperative position, means for rotating said control member into release position, a grinding element opposed to the opposite side of the knife, a control member therefor, and means for preventing the approach of the grinder to the knife when the burr remover is out of contact with the knife, said means including a knob on the grinder control member, and a flange on the burr remover control member, said flange being adapted normally to prevent the movement of said knob toward the knife, but to permit its passage when the burr remover control member is rotated into release position.

3. In association with a slicing machine having a rotary knife and means for driving it, sharpening members adapted to engage opposite sides of the knife edge, control members therefor, means for independently moving said sharpening members toward the knife and means for preventing the engagement of one of said members with the knife until after the other has engaged the knife, including a projection on one of said control members, and a flange on the other adapted to engage said projection when the control member with which the flange is associated and the sharpening member controlled thereby are in inoperative position.

4. In combination with a slicing machine having a rotary knife and means for driving it, a burr removing element adapted to engage one side of the knife edge, a grinding element adapted to engage the opposite side of the knife edge, a rotary member adapted when in one position to hold said burr removing element out of contact with the knife and adapted, when rotated to another position, to permit the approach of said burr remover to the knife, yielding means, opposed thereto, tending normally to move said burr removing element toward the knife, yielding means tending normally to hold the grinding means tending normally to hold the grinding element withdrawn from the knife, and an exteriorly operable thrust member adapted to thrust said grinding element, against said yielding means, toward the knife, and means for preventing actuation of said thrust member when the rotary member is in position to hold the burr removing element out of knife contact.

5. In combination with a slicing machine having a rotary knife and means for driving it, a burr removing element adapted to engage one side of the knife edge, a grinding element adapted to engage the opposite side of the knife edge, a rotary member adapted when in one position to hold said burr removing element out of contact with the knife and adapted, when rotated to another position, to permit the approach of said burr remover to the knife, yielding means, opposed thereto, tending normally to move said burr removing element toward the knife, yielding means tending normally to hold the grinding element withdrawn from the knife, and an exteriorly operable thrust member adapted to thrust said grinding element, against said yielding means, toward the knife, and means for preventing actuation of said thrust member when the rotary member is in position to hold the burr removing element out of knife contact, including a flange on said rotary member, normally opposed to the thrust member, the flange being formed to permit the passage of the thrust member when the rotary member is rotated into position to release the burr removing element.

6. In combination with a slicing machine having a rotary knife, and means for driving it, a burr removing element adapted to engage one side of the knife edge, a grinding element adapted to engage the opposite side of the knife edge, a rotary member adapted when in one position to hold said burr removing element out of contact with the knife and adapted, when rotated to another position, to permit the approach of said burr remover to the knife, yielding means, opposed thereto, tending normally to move said burr removing element toward the knife, yielding means tending normally to hold the grinding element withdrawn from the knife, and an exteriorly operable thrust member adapted to thrust said grinding element, against said yielding means, toward the knife, means for preventing actuation of said thrust member when the rotary member is in position to hold the burr removing element out of knife contact, including a flange on said rotary member normally opposed to the thrust member, the flange being formed to permit the passage of the thrust member when the rotary member is rotated into inoperative position, and means for rotating said rotary member into operative position to hold the burr removing element inoperative, when the grinding element is withdrawn from the knife.

7. In combination with a slicing machine having a rotary knife and means for driving it, a burr removing element adapted to engage one side of the knife edge, a grinding element adapted to engage the opposite side of the knife edge, a rotary member adapted when in one position to hold said burr removing element out of contact with the knife and adapted, when rotated to another position, to permit the approach of said burr remover to the knife, yielding means, opposed thereto, tending normally to move said burr removing element toward the knife, yielding means tending normally to hold the grinding element withdrawn from the knife, and an exteriorly operable thrust member adapted to thrust said grinding element, against said yielding means, toward the knife, means for preventing actuation of said thrust member when the rotary member is in position to hold the burr removing element out of knife contact, including a flange on said rotary member, normally opposed to the thrust member, the flange being formed to permit the passage of the thrust member, when the rotary member is rotated into inoperative position, and means for rotating said rotary member into operative position to hold the burr removing element inoperative, when the grinding element is withdrawn from the knife, said means including a spring associated with said rotary member.

8. In combination with a slicing machine having a rotary knife and means for driving it, a burr removing element adapted to engage one side of the knife edge, yielding means tending normally to move it toward the knife edge, a cam member adapted, when in one position, to hold the burr removing element withdrawn from the knife edge, means for normally holding it in such position, a grinding element adapted to engage the opposite side of the knife edge, yielding means tending normally to hold said grinding element withdrawn from the knife, an individual manually controlled member adapted to be opposed to said yielding means, whereby the grinding element may be thrust into contact with the knife, said cam member normally opposing said control member, and to prevent movement of the grinding element toward the knife, said cam member being formed to permit movement of said control member and grinding element toward the knife when the cam member is moved into position to release the burr removing element for contact with the knife edge.

9. In combination with a slicing machine having a rotary knife and means for driving it, a burr removing element adapted to engage one side of the knife edge, yielding means tending normally to move it toward the knife edge, a cam member adapted, when in one position, to hold the burr removing element withdrawn from the knife edge, yielding means for normally holding it in such position, a grinding element adapted to engage the opposite side of the knife edge, yielding means tending normally to hold said grinding element withdrawn from the knife, an individual manually controlled member adapted to be opposed to said yielding means, whereby the grinding element may be thrust into contact with the knife, said cam member normally opposing said control member, and to prevent movement of the grinding element toward the knife, said cam member being formed to permit movement of said control member and grinding element toward the knife when the cam member is moved into position to release the burr removing element for contact with the knife edge, and a handle member associated with said cam and adapted to permit manual rotation of said cam against said yielding means.

10. In association with a slicing machine having a rotary knife and means for driving it, a burr removing member mounted to be presented to one side of the knife edge, a grinding member mounted to be presented to the opposite side of the knife edge, manually operable means for thrusting the grinding member into contact with the knife, yielding means for moving the burr removing member into contact with the knife and locking means, operable against the grinding member only, adapted to prevent it from approaching the knife until the burr removing member has engaged the knife.

11. In association with a slicing machine having a rotary knife and means for driving it, a burr removing member mounted to be presented to one side of the knife edge, a grinding member mounted to be presented to the opposite side of the knife edge, manually operable means for thrusting the grinding member into contact with the knife, yielding means for moving the burr removing member into contact with the knife, manually operable means for normally holding said burr removing member out of contact with the knife and for permitting its yielding approach thereto, and locking means, associated with said manual control, adapted to prevent the grinding member from approaching the knife until the burr removing member has been released for engagement with the knife.

12. In association with a slicing machine having a rotary knife and means for driving it, a burr removing member mounted to be presented to one side of the knife edge, a grinding member mounted to be presented to the opposite side of the knife edge, manually operable means for thrusting the grinding member into contact with the knife, yielding means for moving the burr removing member into contact with the knife, manually operable means for normally holding said burr removing member out of contact with the knife, including a manually rotatable member and yielding means for holding it normally in operative position, such locking means including a lateral projection from said manually rotatable member adapted to be rotated into inoperative position in response to rotation of said manually rotatable member into position to release the burr removing member for contact with the knife.

Signed at Indianapolis, county of Marion and State of Indiana, this 1st day of July, 1927.

WILLIAM J. CAMPBELL.